United States Patent [19]
Daicho et al.

[11] Patent Number: 4,928,919
[45] Date of Patent: May 29, 1990

[54] STOP VALVE

[75] Inventors: Norio Daicho; Masakatsu Kawahara; Jiro Nitta; Koji Miyazaki; Keitaro Yonezawa, all of Hyogoken, Japan

[73] Assignee: Kabushiki Kaisha Neriki, Hyogoken, Japan

[21] Appl. No.: 423,284

[22] Filed: Oct. 18, 1989

[30] Foreign Application Priority Data

Oct. 21, 1988 [JP] Japan .................................. 1-266814
Apr. 5, 1989 [JP] Japan .................................. 64-87647

[51] Int. Cl.$^5$ ...................... F16K 31/50; F16K 35/00
[52] U.S. Cl. ........................................ 251/89; 251/278; 251/291; 251/297; 251/335.2
[58] Field of Search ................ 251/89, 90, 104, 105, 251/106, 221, 222, 223, 225, 227, 264, 276, 278, 291, 297, 335.2, 331

[56] References Cited

U.S. PATENT DOCUMENTS

| | | | |
|---|---|---|---|
| 3,072,135 | 1/1963 | Moskow | 251/297 |
| 4,043,351 | 8/1977 | Durling | 251/297 |
| 4,531,579 | 7/1985 | Larronde et al. | 251/89 |
| 4,768,543 | 9/1988 | Wienke et al. | 137/606 |

FOREIGN PATENT DOCUMENTS

| | | | |
|---|---|---|---|
| 2251766 | 11/1973 | Fed. Rep. of Germany | 251/89 |
| 62-258276 | 3/1987 | Japan | 251/89 |

*Primary Examiner*—George L. Walton
*Attorney, Agent, or Firm*—Lowe, Price, LeBlanc, Becker & Shur

[57] ABSTRACT

There are provided coned disc springs and an intermediate transmission member in order between a thrust threaded member for generating the valve closing thrust and a valve body, and the intermediate transmission member is adapted to be urged by means of the coned disc springs toward the valve closing side with respect to the thrust threaded member. A contact receiving means is so arranged as to limit the movement of the thrust threaded member toward the valve closing side, and a contact receiving position of the contact receiving means is set at a midway position of the compression range of the coned disc springs. Wherein, the handle is adapted to be changed over between the handle held condition and the handle released condition by the relative movement of the intermediate transmission member with respect to the thrust threaded member.

9 Claims, 5 Drawing Sheets

STOP VALVE

BACKGROUND OF THE INVENTION

1. Field of the Invention

The present invention relates to a stop valve which is adapted to be employed for a gas storage container or interposed in a midway position of a piping and, more particularly, to a technique to prevent a fluid leakage caused by an accidental opening of a stop valve of which handle would be turned by other objects brought into contact therewith or by a mistaken manipulation thereof.

2. Description of the Prior Art

For such a kind of stop valve, the basic construction thereof is disclosed in Japanese Laid-Open Patent Publication No. 1987-258276 which was formerly proposed by the inventors of the present invention.

As shown in FIGS. 9 and 10, the basic construction is as follows.

When a handle 107 of a stop valve 102 is turned in the valve closing direction thereof, a thrust threaded member 125 is adapted to be advanced like a screw relative to a valve box 109 and a valve body 114 is adapted to be moved toward the valve closing side by a thrust imparted thereby 125 so that a valve body sealing surface 114a can be brought into contact with a valve seat 110a to attain a valve closing. The handle 107 is fitted to the input portion 125a of the thrust threaded member 125 so as to transmit a turning force thereto 125 as well as to be detachable in the axial direction thereof 125. There are provided at least coned disc springs S' and an intermediate transmission member 126 in order within a valve closing thrust transmission mechanism T' arranged from the thrust threaded member 125 to the valve body 114 so that the intermediate transmission member 126 can be urged in the valve closing direction by means of the coned disc springs S' under a condition capable of being advanced and returned within a predetermined extent in the valve opening and closing directions relative to the thrust threaded member 125.

A restraining means 142 for stoppers 141 for the handle 107 is formed along both the thrust threaded member 125 and the intermediate transmission member 126. This restraining means 142 is so constructed as to be changed over between a handle holding condition A' wherein the stopper 141 is restrained in a stopping engagement position X' with respect to the handle 107 and a handle releasing condition B' wherein the restraint against the stopper 129 is released.

Under such a condition that the intermediate transmission member 126 has been advanced toward the valve closing side by means of the coned disc springs S' relative to the thrust threaded member 125, the restraining means 142 is adapted to be brought into the handle holding condition A'.

To the contrary, under such a condition that the thrust threaded member 125 has been advanced toward the valve closing side against the coned disc springs S' relative to the intermediate transmission member 126, the restraining means 142 is adapted to be brought into the handle releasing condition B'.

In the above-mentioned basic construction, a construction of the portion for transmitting a thrust from the thrust threaded member 125 to the valve body 114 through the intermediate transmission member 126 is as follows, as shown in FIGS. 9 and 10.

That is, an output portion 125b of the thrust threaded member 125, the coned disc springs S' and an input portion 126a of the intermediate transmission member 126 are arranged in series so that the whole thrust imparted by the thrust threaded member 125 can be transmitted to the valve body 114 through the coned disc springs S' and the intermediate transmission member 126 in order.

In the above-mentioned conventional construction, the valve closing manipulation for the stop valve 102 is carried out as follows.

When the handle 107 is manipulated so as to be turned in the valve closing direction from the valve-opened state shown by solid lines in FIGS. 9 and 10, the thrust threaded member 125 is advanced like a screw so that the valve body 114 can be moved toward the valve seat 110a through the coned disc springs S' and the intermediate transmission member 126. During the enhancement of the contact pressure between the valve body sealing surface 114a of the valve body 114 and the valve seat 110a after they have been brought into contact with each other, the intermediate transmission member 126 is received by the valve seat 110a through the valve body 114 and meantime the thrust threaded member 125 is further advanced so that the coned disc spring S' are compressed. And when the coned disc springs S' have been compressed completely, the thrust threaded member 125 is received by the intermediate transmission member 126 through the coned disc springs S' which have been made undeformable any more and the handle 107 becomes unturnable abruptly. An operator feels that unturnable state by a heavy resistance thereof and then finishes the valve closing manipulation of the handle 107. In this valve-closed state, the thrust threaded member 125 is advanced toward the valve closing side relative to the intermediate transmission member 126 so that the restraining means 142 can be opened and changed over to the handle releasing condition B' (refer to a figure indicated by an alternate long and two short dashes line in FIG. 10). Whereby, the handle 107 can be pulled off from the thrust threaded member 125 by merely lifting it 107 up (refer to a figure by an alternate long and short dash line in FIG. 10).

However, since the conventional construction of the stop valve is used as mentioned above, there are following problems associated therewith.

Since the coned disc springs S' are compressed completely at the time of the valve closing manipulation, they are apt to cause creep deformations due to a multiplicity of repetitions of the valve closing manipulation. In the case of such creep deformations of the coned disc springs S', the handle 107 can be manipulated for the valve closing by a small force as well as the thrust threaded member 125 can be advanced readily toward the valve closing side relative to the intermediate transmission member 126 so that the restraining means 142 is changed over to the handle releasing condition B'. Therefore, in spite of the incompletion of the valve closing manipulation, the handle 107 is allowed to be pulled off. Resultantly, a contact force provided for a sealing between the valve body sealing surface 114a and the valve seat 110a becomes insufficient and a leak of fluid is caused.

Further, when the stop valve 102 is subjected to a vibration in its valve closed state, an engaged threaded portion of the thrust threaded member 125 is apt to be loosened due to the creep deformations of the coned disc springs S'. Thereby also, a leak of fluid is caused.

SUMMARY OF THE INVENTION

It is an object of the present invention to provide a stop valve in which a creep deformation of a coned disc spring can be eliminated and a fluid leakage under a valve-closed condition can be prevented.

For accomplishing an above-mentioned object, the present invention is directed to improving the above-mentioned basic construction as follows.

That is, at least either of an intermediate transmission member and a fixing side portion of a valve box is provided with a contact receiving means for limiting an advancing movement of a thrust threaded member beyond a predetermined distance toward the valve closing side, and a contact receiving position of the contact receiving means is set at a midway position of a compression range of a coned disc spring.

According to the present invention, at the time of valve closing manipulation of a stop valve, the coned disc springs are adapted to be not compressed beyond a midway position of the compression range thereof so as to be prevented from being compressed completely. Therefore, even though the valve closing is repeated a great number of times, still the coned disc springs can be kept in a good resilient state.

Accordingly, a restraining means can be prevented for a long time from being changed over to the handle releasing condition before the completion of the valve closing manipulation so that the valve closing can be accomplished surely. Furthermore, even in case that a valve seat and a valve body sealing surface suffer a creep deformation due to the long time valve closing, such deformation can be compensated by the extensions of the coned disc springs. And even in case that the stop valve in the closed state is subjected to a vibration, a loosening at an engaged threaded portion of the thrust threaded member can be prevented by means of a resilient pressing force of the coned disc springs. Therefore, the good closed condition of the stop valve can be maintained surely.

In that way, since the valve closing can be accomplished surely as well as the good closed condition of the stop valve can be maintained, a leak of fluid can be prevented perfectly.

The foregoing and other objects and attendant advantages of the present invention will be readily appreciated as the same becomes better understood by reference to the following detailed description when considered by the accompanying drawings, wherein:

BRIEF DESCRIPTION OF THE DRAWINGS

FIGS. 1 through 6 show a first embodiment thereof;

FIG. 1 is a partial sectional side view showing a stop valve mounted to a gas storage container;

FIG. 2 is a vertical sectional view of the stop valve;

FIG. 3 is a sectional view on III—III directed line in FIG. 2;

FIG. 4 is a view on IV—IV directed line in FIG. 2;

FIG. 5 is an explanatory view for a handle removing manipulation;

FIG. 6 is a diagram showing the relation between a turning angle of the handle and a resistance against the handle closing manipulation;

FIGS. 7 and 8 show a second embodiment thereof;

FIG. 7 is a view corresponding to FIG. 1;
FIG. 8 is a view corresponding to FIG. 2;
FIG. 9 is a vertical sectional view of a conventional stop valve;
and
FIG. 10 is an explanatory view for a handle removing manipulation.

DESCRIPTION OF THE PREFERRED EMBODIMENTS

Now embodiments of the present invention will be explained with reference to the accompanying drawings.

First Embodiment

FIGS. 1 through 6 show a first embodiment.

Figure 1:
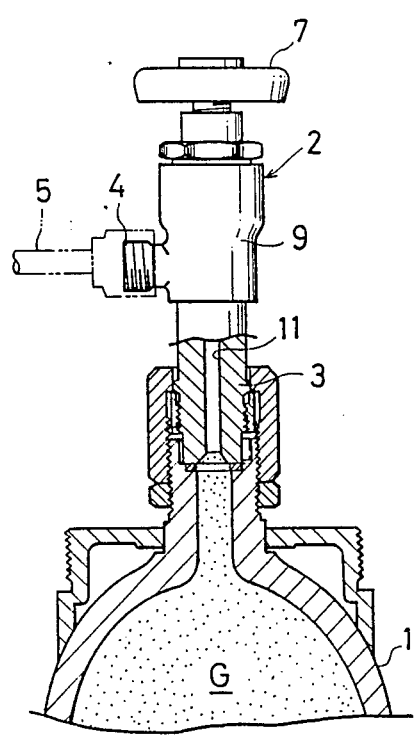

In FIG. 1, the symbol 1 shows a gas storage container which is charged with a pressurized superiorly purified gas G to be used for manufacturing semiconductor integrated circuits and to which a stop valve 2 is threadably secured at its foot portion 3 for controlling the takeout of the superiorly purified gas G. An outlet nozzle 4 of the stop valve 2 is connected to an unillustrated installation for use of the gas through a gas takeout conduit 5.

Figure 3:
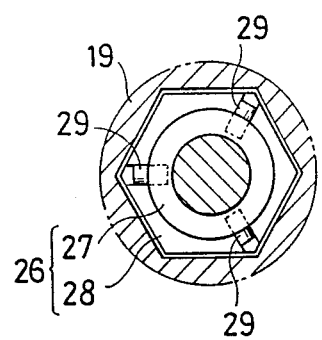
FIGS. 1 through 8 show embodiments of the present invention.

The stop valve 2 will be explained with reference to FIGS. 2 and 3.

The symbol 7 designates a handle, and the symbol 9 designates a valve box. A valve chamber 10 is formed within the valve box 9, and an inlet port 11 and an outlet port 12 are communicated with the valve chamber 10. A valve seat 10a is formed in the upper end portion of the inlet port 11. The valve chamber 10 is provided with a valve body 14 which is adapted to be moved relative to the valve seat 10a so as to perform the valve opening and the valve closing. And the sealing surface 14a of the valve body 14 is adapted to be urged against the valve seat 10a through a valve closing thrust transmission mechanism T arranged within the valve box 9.

That is, there are provided a valve opening spring 16 which resiliently urges the valve body 14 upward and a metallic diaphragm 17 which is kept in contact with the upper end of the valve body 14 and partitions the valve chamber 10 in an air-tight manner. The peripheral portion of the diaphragm 17 is adapted to be fixedly pushed onto the valve box 9 by a plug bolt 21 through a pushing cylinder 20 and a press ring 19 arranged in order from upper side. A thrust threaded member 25 is threadably engaged with the upper portion of the pushing cylinder 20 so as to be advanced and retreated vertically adjustably. And the handle 7 is fitted to an input portion 25a of the upper end of the thrust threaded member 25 so as to transmit a turning force thereto and to be removable in the axial direction. An intermediate transmission member 26 is passed through the thrust threaded member 25 so as to be vertically slidable. Further, there are provided coned disc springs S which serve to resiliently urge the intermediate transmission member 26 downward relative to the thrust threaded member 25.

The intermediate transmission member 26 comprises a transmission body 27 and a pushing piece 28 which is fitted around the lower portion thereof 27 so that a relative revolution therebetween 27, 28 can be prevented by means of a plurality of pins 29. The pushing piece 28 has an outer peripheral surface configured in a hexagon and is fitted in the press ring 19 so that a relative revolution therebetween 19, 28 can be prevented by means of the hexagon. A revolution absorbing transmission member 31 is interposed between the thrust threaded member 25 and the coned disc springs S, and the thrust threaded member 25 is turnably kept in contact with the revolution absorbing transmission member 31 through a thrust bearing 32. The coned disc springs S are stacked within a spring chamber 33 formed between the intermediate transmission member 26 and the revolution absorbing transmission member 31.

Further, a contact receiving means 34 is formed in the upper portion of the press ring 19 on the fixing side of the valve box 9 in order to prevent the movement of the thrust threaded member 25 toward the valve closing side beyond a predetermined distance. The contact receiving means 34 is disposed below the lower end portion of the revolution absorbing transmission member 31 with being spaced apart by a contact gap D, and the contact receiving position is located at a midway position of a compression range of the coned disc springs S. That is, the contact gap D is set at a dimension larger than a valve opening gap E of the valve body 14, and a dimensional difference (D−E) obtained by subtracting the valve opening gap E from the contact gap D is set at a value smaller than a contraction value provided by the complete compressions of the coned disc springs S. Incidentally, a dimension of a height gap F between the intermediate transmission member 26 and the revolution absorbing transmission member 31 may be not less than the dimensional difference (D−E).

Figure 4:
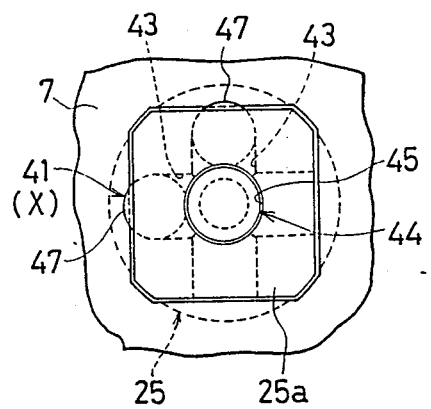

Further, there is provided a restraining means 42 for stoppers 41 of the handle 7. As shown in FIGS. 4 and 5, the restraining means 42 comprises guide holes 43 for the stoppers 41, a pushing-out member 44 for the stoppers 41 and a slide hole 45 for the pushing-out member 44 and arranged as follows.

The slide hole 45 is formed in the thrust threaded member 25 along the axial direction. The guide holes 43 are formed in the input portion 25a of the thrust threaded member 25 so as to extend radially, intersect perpendicularly each other and communicate with the slide hole 45. The pushing-out member 44 is composed of a stepping-up cam portion 44a for carrying out the pushing-out and a stepping-down concaved portion 44b for cancelling the pushing-out, which are arranged adjacently each other in the axial direction. A steel ball 47 which constructs the stopper 41 is arranged within each guide hole 43 so as to be able to advance and retreat radially. The pushing-out member 44 is inserted into the slide hole 45 vertically slidably and connected interlockingly at its lower portion to the intermediate transmission member 26 (both the members 26, 44 are formed integratedly as a one piece in this embodiment).

Figure 5A:
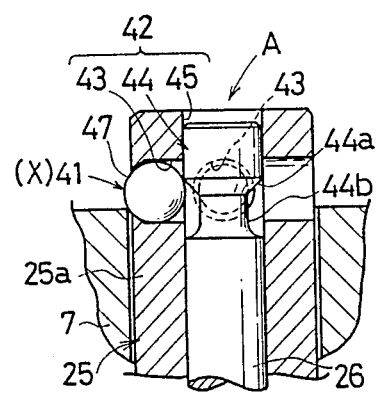

And as shown in FIG. 5(a), under such a condition that the intermediate transmission member 26 has been advanced toward the valve closing side by means of the coned disc springs S relative to the thrust threaded member 25, the stoppers 41 are projected outside the peripheral surface of the input portion 25a of the thrust threaded member 25 by the stepping-up cam portion 44a so as to be changed over to a stopping engagement position X for holding the handle 7 and the restraining means 42 gets into a handle holding condition A.

Figure 5B:
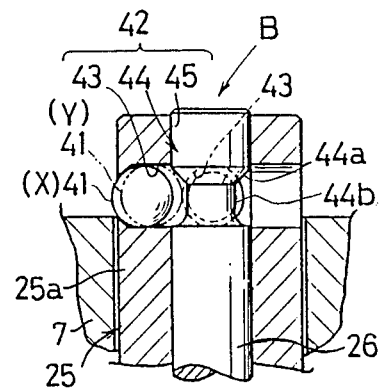

To the contrary, as shown in FIG. 5(b), under such a condition that the thrust threaded member 25 has been advanced toward the valve closing side against the coned disc springs S relative to the intermediate transmission member 26 the stoppers 41 become possible to be retreated into the stepping-down concaved portion 44b so as to be changed over to a stopping cancellation position Y for releasing the handle 7 and the restraining means 42 gets into a handle releasing condition B.

The valve closing manipulation of the stop valve 2 having the above-mentioned construction is carried out as follows.

Figure 2:
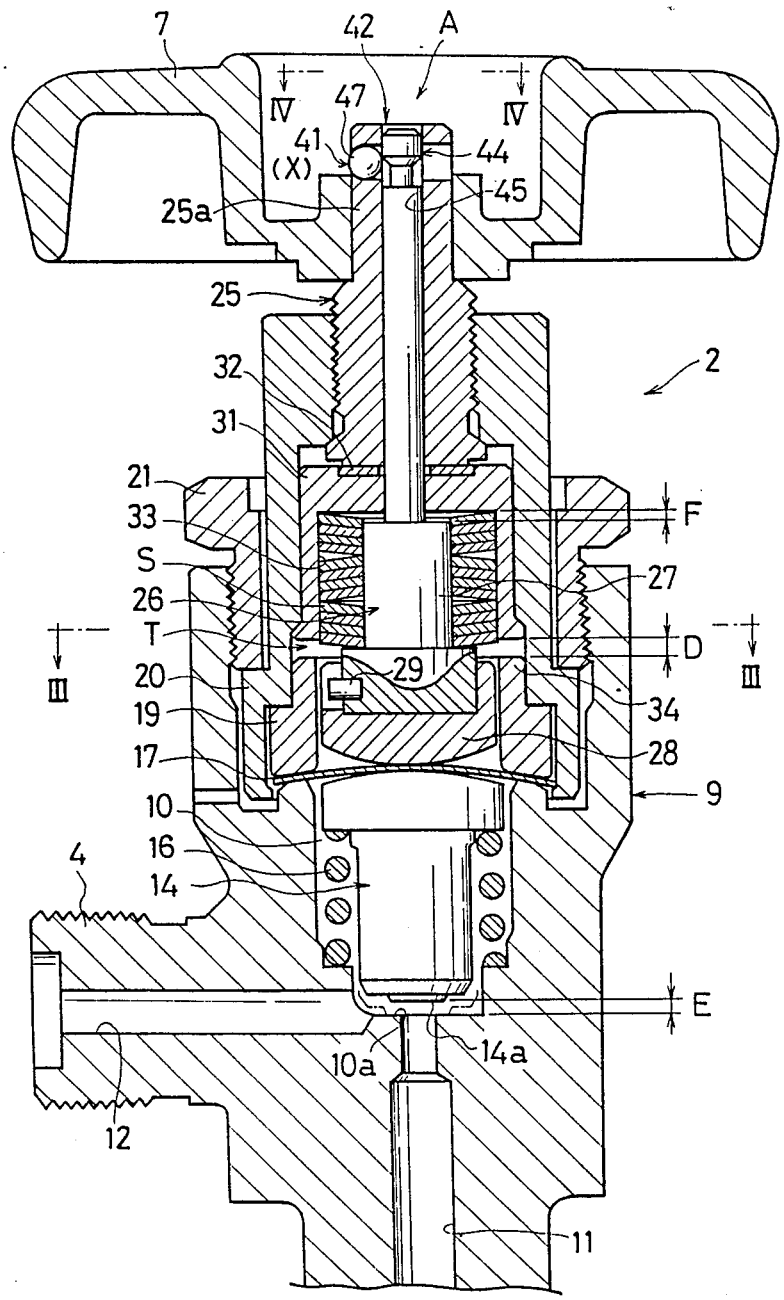

FIGS. 2 and 5(a) show a valve opened condition of the stop valve 2, in which the valve opening gap E is provided between the sealing surface 14a of the valve body 14 and the valve seat 10a. The intermediate transmission member 26 has been advanced by means of the coned disc springs S toward the valve closing side relative to the thrust threaded member 25 and the restraining means 42 has gotten into the handle holding condition A so that the stoppers 41 can be secured at the stopping engagement position X where they are projected outside the fitting interface between the input portion 25a of the thrust threaded member 25 and the handle 7. Therefore, the handle 7 is engaged with the stoppers 41 so as to be prevented from being pulled off from the thrust threaded member 25.

When the handle 7 is turned in the valve closing direction from this valve opened condition, the thrust threaded member 25 is advanced downward like a screw so that the valve body 14 can be moved toward the valve seat 10a by the valve opening gap E through the bearing 32, the revolution absorbing transmission member 31, the coned disc springs S, the intermediate transmission member 26 and the diaphragm 17 in order so that the sealing surface 14a of the valve body 14 can be brought into contact with the valve seat 10a (as indicated by an alternate long and short dash line in FIG. 2). Under this condition, the gap dimension between the revolution absorbing transmission member 31 and the contact receiving means 34 takes the value (D−E). Then, as the thrust threaded member 25 is advanced downward like a screw by the turning manipulation of the handle 7, the sealing contact force of the sealing surface 14a relative to the valve seat 10a is increased. On the way of the advancement, while the intermediate transmission member 26 is received by the valve seat 10a through the valve body 14, the revolution absorbing transmission member 31 is lowered by the thrust threaded member 25. Whereby, the coned disc springs S start to be compressed and the sealing contact force of the sealing surface 14a is increased gradually. On the way of compressions of the coned disc springs S, since the lowering of the revolution absorbing transmission member 31 is received by the contact receiving means 34, the coned disc springs S are prevented from being compressed beyond that state at the time of receiving as well as it becomes impossible to turn the handle 7 in the valve closing direction. Thereupon, the valve closing manipulation of the handle 7 is completed.

Under this valve closed condition, as shown in FIG. 5(b), the thrust threaded member 25 is advanced toward the valve closing side relative to the intermediate transmission member 26 and the restraining means 42 is changed over to the handle releasing condition B so that the stoppers 41 can be retreated freely to the stopping cancellation position Y inside of the fitting surface between the handle 7 and the thrust threaded member 25. Whereby, the handle 7 can be pulled off from the thrust threaded member 25 with retreating the stoppers 41 to the stopping cancellation position Y by merely lifting the handle 7.

To the contrary, at the time of the valve opening manipulation of the stop valve 2, the handle 7 is attached to the thrust threaded member 25 under the above-mentioned valve closed condition and then the handle 7 is turned in the valve opening direction so that the thrust threaded member 25 can be returned upward. Thereupon, the valve body 14 is moved upward by means of the resilient force of the valve opening spring 16 so as to be separated from the valve seat 10a and to communicate the inlet port 11 with the outlet port 12 each other.

The valve closing manipulation of the stop valve 2 will be explained more in detail as follows.

That is, when the handle 7 is further turned in the valve closing direction under such a condition that the valve body sealing surface 14a is kept in contact with the valve seat 10a as indicated by the alternate long and short dash line in FIG. 2, the sealing surface 14a starts to be deformed. When the deformation resistance is increased beyond a predetermined value, the compressions of the coned disc springs S are started. At a midway position of the compression range thereof S, the movement of the thrust threaded member 25 toward the valve closing side is blocked by means of the contact receiving means 34. Whereby, the complete compressions of the coned disc springs S can be prevented as well as it becomes impossible to transmit the manipulation force for the handle 7 to the valve body 14 so that the valve body sealing surface 14a is not subjected to an abnormally large sealing contact force.

Figure 6:
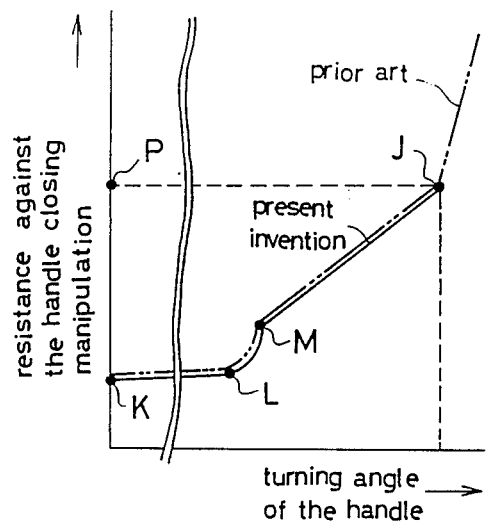

The resistance during the turning of the handle 7 in the valve closing direction changes as shown in FIG. 6. That is, while the handle 7 is turned in the valve closing direction from the full open position K of the valve body sealing surface 14a to the midway position J of the compression range of the coned disc springs S via the valve seat contact position L of the sealing surface 14a and the compression start position M of the springs S in order, the resistance curve (indicated by a solid line) according to the present invention changes similarly to that (indicated by an alternate long and two short dashes line) in the conventional embodiment. The resilient reaction force of the coned disc springs S is so set that a sealing contact force of a suitable value P can be provided for the valve body sealing surface 14a at the midway position J, whereat it becomes impossible to turn the handle 7 in the valve closing direction any more.

During the valve closing manipulation, since the coned disc springs S are prevented from being compressed beyond that state at the midway position of the compression range, they are not brought into the completely compressed condition differently from the conventional embodiment. Accordingly, even in case that the accumulated repetition number of the valve closing manipulation becomes large, a creep deformation is not caused in the coned disc springs S and the resilient reaction force of the springs S can be maintained in a strong state. Accordingly, the thrust threaded member 25 can be prevented from being loosened by a vibration and the sealing contact force of the valve body sealing surface 14a can be maintained in a suitable state.

Even though an excessively large force is exerted for turning the handle 7 in the valve closing direction as a mistaken manipulation force, the valve body sealing surface 14a or the valve seat 10a is prevented from being damaged thereby because the manipulation force is adapted to be received by the valve box 9 through the contact receiving means 34 so as not to be transmitted to the valve and so that the sealing contact force of the sealing surface 14a can be prevented from being increased beyond the suitable value P.

As mentioned above, since the sealing contact force of the valve body sealing surface 14a can be maintained in a suitable value by preventing the thrust threaded member 25 from being loosened by an occasional vibration under the valve closed condition and the sealing surface 14a or the valve seat 10a can be prevented from being damaged by an excessive turning of the handle 7 in the valve closing, a leak of fluid can be prevented more surely.

Further, though an excessively large force is exerted for turning the handle 7 in the valve closing direction as a mistake, the diaphragm 17 can be prevented from being subjected to an excessively large pressure so as to prolong the service life thereof 17.

Furthermore, when the thrust threaded member 25 is advanced toward the valve closing side with respect to the intermediate transmission member 26 during the valve closing manipulation, a friction force doesn't act between the thrust threaded member 25 and the coned disc springs S because the thrust threaded member 25 is rotatably kept in contact with the revolution absorbing transmission member 31. Therefore, since a resistance against the revolution of the thrust threaded member 25 can be made smaller correspondingly, the turning manipulation of the handle 7 becomes easy.

On one hand, the respective balls 47, 47 as the stoppers 41 are adapted to be changed over between the stopping engagement position X and the stopping cancellation position Y by merely advancing and retreating through the guide holes 43. Even though the balls 47 as the stoppers 41 are changed over to either position, since they are prevented from being subjected to the spring force of the coned disc springs S, the contact pressure thereof 47 can be limited to a small value and the durability thereof 47 can be enhanced. Further, since the contact pressure of the ball 47 as the stopper 41 can be limited to a small value, the number thereof to be mounted can be decreased and the construction for assembling them can be simplified so that the assembly working can be facilitated.

Furthermore, under the valve opened condition of the stop valve 2, the restraining means 42 takes the handle holding condition A and the pushing-out member 44 retreats inside of the thrust threaded member 25. On the contrary, under the valve closed condition of the stop valve 2, the restraining means 42 takes the handle releasing condition B and the pushing-out member 44 advances outside the thrust threaded member 25. Accordingly, the valve opening and closing conditions of the stop valve 2 can be confirmed readily by the observation of the height of the pushing-out member 44. Incidentally in the case that the thrust threaded member 25 is provided in its upper portion with height graduations as well as the pushing-out member 44 is provided at its upper portion with an indicator, it becomes easier to confirm the opening and closing condition of the stop valve 2.

Second Embodiment

Figure 7:
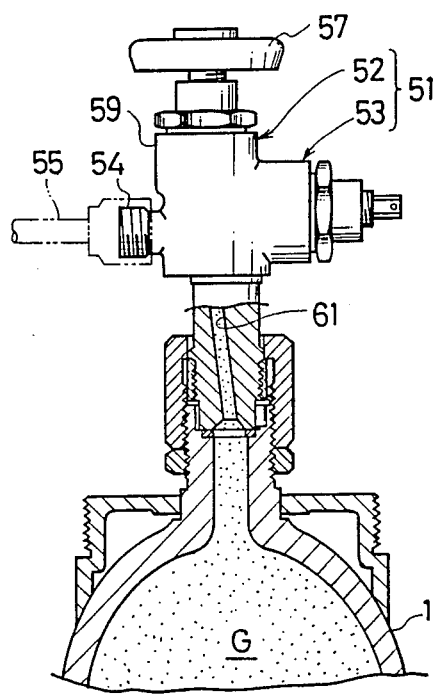
Figure 8:
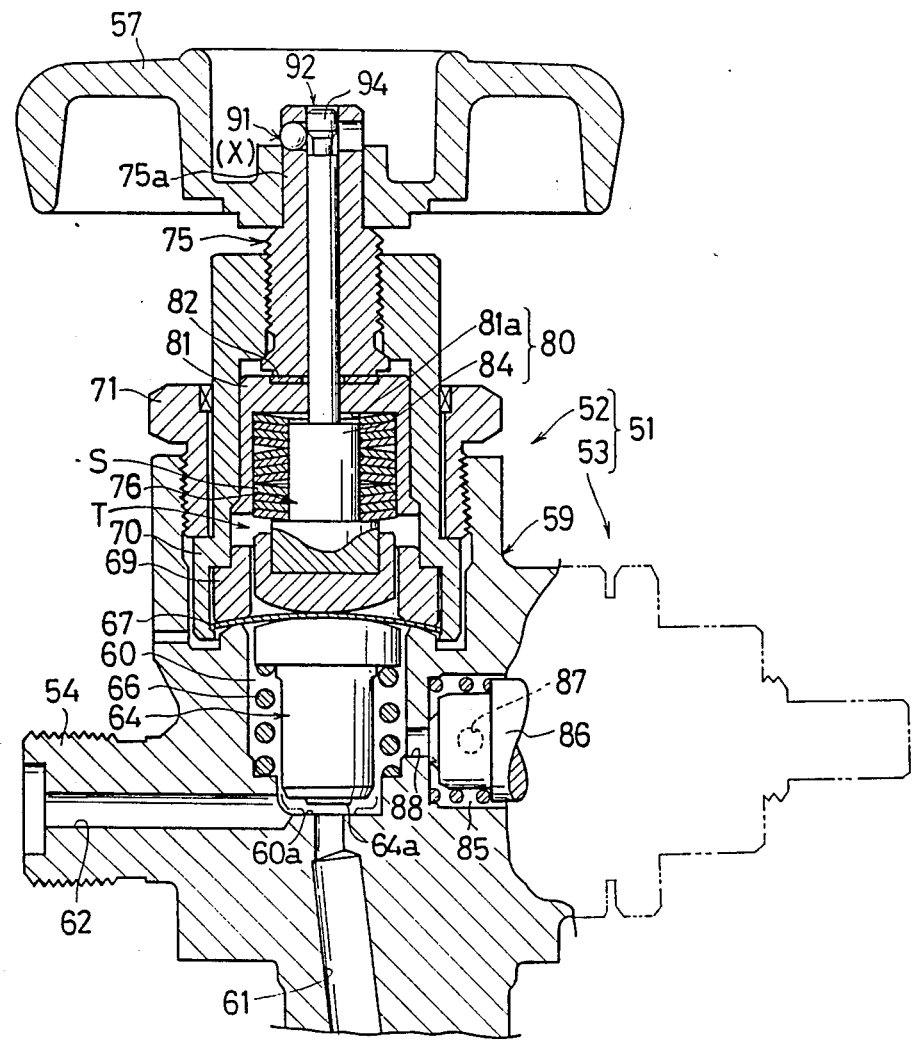
Figure 10:
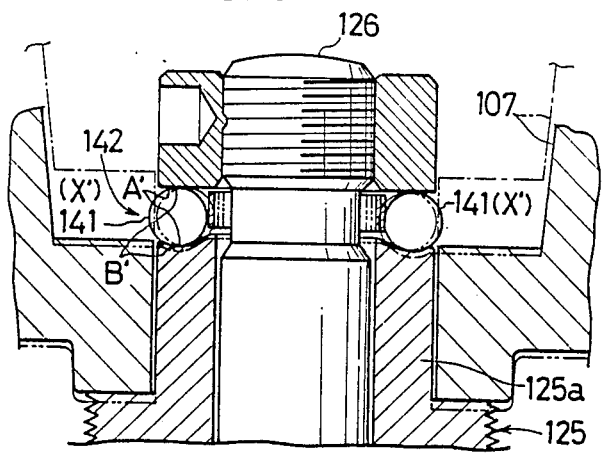
FIGS. 9 and 10 show a conventional embodiment.
Figure 9:
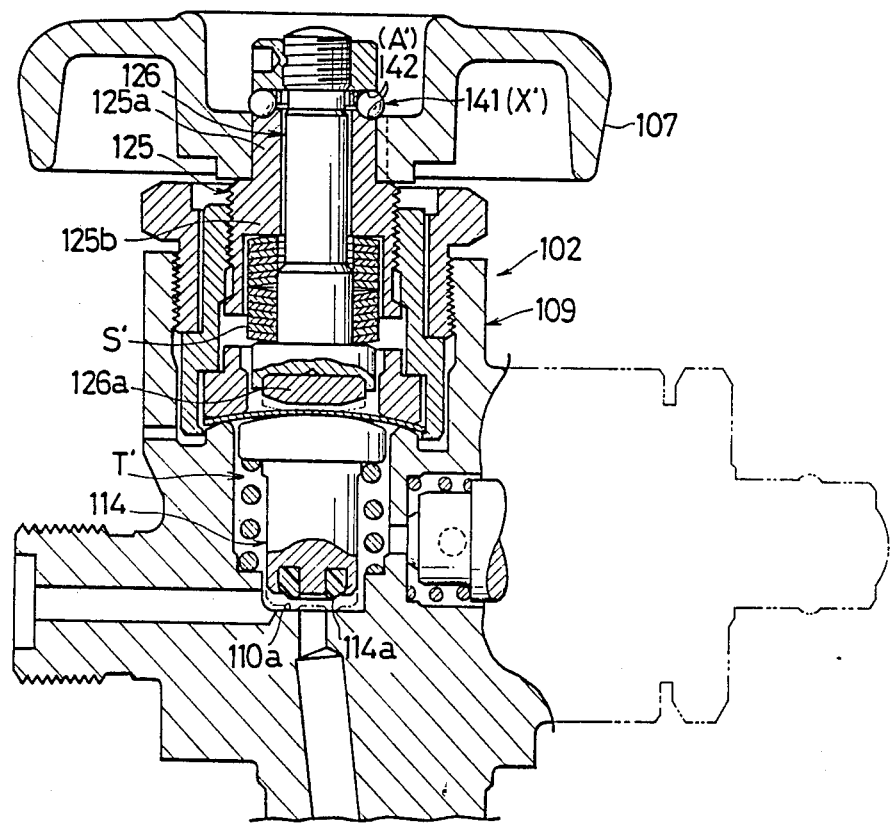

FIGS. 7 and 8 show a second embodiment.

A valve means 51 is provided with a stop valve 52 for a container 1 and a purging stop valve 53. These stop valves 52, 53 are assembled within a common valve box 59. The stop valve 52 for the container 1 has a construction nearly similar to the stop valve 2 of the first embodiment. Though the above-mentioned purging stop valve 53 is constructed nearly the same as the stop valve 52 for the container 1, it has the following different portions. That is, a valve body 86 is accommodated within a valve chamber 85 formed laterally, and an inlet port 87 for a purging gas is opened in the peripheral wall of the valve chamber 85. And an outlet port 88 for the purging gas is opened in the peripheral wall of the valve chamber 60 of the stop valve 52 for the container 1.

The changing over manipulation of the valve means 51 is carried out as follows.

At the time of supply of the superiorly purified gas G, the stop valve 52 for the container 1 is opened and the purging stop valve 53 is closed.

At the time of the purging, firstly the stop valve 52 for the container 1 is closed and the handle 57 is allowed to be pulled off after the completion of the valve closing manipulation. Then, the handle 57 is attached to the purging stop valve 53 so that the purging stop valve 53 can be manipulated to be opened. Thereupon, the purging gas is supplied at a high pressure from the purging inlet port 87 into a gas takeout conduit 55 through the valve chamber 85, the purging gas outlet port 88, the valve chamber 60 and an outlet port 62. In this case, since the valve opening manipulation of the purging stop valve 53 becomes possible finally after the completion of the valve closing manipulation of the stop valve 52 for the container 1, the superiorly purified gas G within an inlet port 61 can be prevented from flowing to the purging gas side by a mistaken manipulation. Also in the case that the superiorly purified gas G is supplied again, the valve opening manipulation of the stop valve 52 for the container 1 becomes possible finally after the completion of the valve closing manipulation of the purging stop valve 53. Therefore, the purging gas can be prevented from flowing into the gas container 1 by a mistaken manipulation.

The respective stop valves 52, 53 have roughly similar constructions. The construction, for example of the stop valve 52 for the container 1 will be explained in detail representatively.

The stop valve 52 is not provided with the contact receiving means 34 (refer to FIG. 2) of the stop valve 2 in the first embodiment, and the portion corresponding to the contact receiving means 34 is constructed as follows.

That is, a contact transmission means 80 is disposed in parallel with the coned disc springs S transmittibly to each other between an intermediate transmission member 76 and a revolution absorbing transmission member 81. The contact transmission means 80 comprises a contact receiving portion 84 disposed on the intermediate transmission member 76 and a spring retaining surface 81a of the revolution absorbing transmission member 81. The contact receiving portion 84 serves to limit the lowering movement of the thrust threaded member 25 toward the valve closing side beyond a predetermined distance. A contact receiving position of the contact receiving portion 84 is located at a midway position of the compression range of the coned disc springs S. Incidentally, the symbol 82 designates a thrust bearing.

Now, other component parts will be explained adjoining with symbols. The symbol 66 designates a valve opening spring, the symbol 67 does a diaphragm, the symbol 69 does a press ring, the symbol 70 does a pushing cylinder, and the symbol 71 does a plug bolt. The stop valve 52 is provided in its upper portion with a restraining means 92 for the stoppers 91 of the handle 57. The symbol 94 designates a pushing-out member for the stoppers 91.

The aforementioned stop valve 52 functions as follows.

When the handle 57 is turned in the valve closing direction from the valve opened condition of the stop valve 52, the thrust threaded member 75 is advanced like a screw so that the valve body 64 can be moved toward the valve seat 60a through the coned disc springs S and the intermediate transmission member 76. During the enhancement of the contact pressure between the sealing surface 64a of the valve body 64 and the valve seat 60a after they have been brought into contact with each other, the intermediate transmission member 76 is received by the valve seat 60a through the valve body 64 and on the contrary, the thrust threaded member 75 is further advanced so as to compress the coned disc springs S continuously.

On the way of compression of the coned disc springs S, the spring retaining surface 81a of the revolution absorbing transmission member 81 is brought into contact with the contact receiving portion 84 of the intermediate transmission member 76 so that the coned disc springs S can be prevented from being compressed beyond that state at the time of contact, and the thrust imparted by the thrust threaded member 75 is transmitted to the intermediate transmission member 76 through the coned disc springs S and the contact transmission means 80. Thereupon, the manipulation of the handle 57 becomes hard abruptly to be turned. Whereby, since an operator can feel by a heavy resistance against the handle turning that the sealing surface 64a of the valve body 64 has become to be subjected to a predetermined sealing pressure, the valve closing manipulation for the handle 57 is completed with preventing the coned disc springs S from being compressed completely. Thereupon, similarly to the first embodiment, the handle 57 is allowed to be pulled off from the input portion 75a of the thrust threaded member 75 under this valve closed condition.

In addition to the provision of the contact receiving portion 84 in the upper portion of the intermediate transmission member 76, similarly to the first embodiment, the contact receiving portion may be projected from the upper portion of the press ring 69. In this case, the lower end of the revolution absorbing transmission member 81 may be adapted to be brought into contact with the contact receiving portion of the press ring 69 after the spring retaining surface 81a of the revolution absorbing transmission member 81 is brought into contact with the contact receiving portion 84 of the intermediate transmission member 76.

Further, the stop valve 52 for the container 1 in the second embodiment may be of the type being used as a single stop valve similarly to the first embodiment.

Furthermore, the stop valves in the respective embodiments may be interposed in a piping and may be used as a liquid stop valve, too.

What is claimed is:

1. A stop valve, including a handle used for valve opening and closing manipulations and adapted to be detached after completion of a valve closing manipulation, comprising:
   a valve box, provided with a valve chamber having a valve seat;

a movable valve body provided with a sealing surface selectively movable to a valve opening position and to a valve closing position with respect to said valve seat within the valve chamber;

a thrust threaded member provided with an input portion, threadably engaged with the valve box so as to be adjustably advanced and returned with respect thereto;

a handle, adapted to be rotatably interlockingly connected to said input portion and to be attached and detached in the axial direction with respect thereto wherein, when said handle is turned in a valve closing direction the thrust threaded member is advanced with respect to the valve box and said valve body is moved toward the valve closing side by a thrust imparted by the thrust threaded member so that the sealing surface thereof is brought into contact with the valve seat to attain a valve closing;

a valve closing thrust transmission mechanism comprising at least coned disc spring surrounding an intermediate transmission member arranged in order from the thrust threaded member to the valve body, so that the intermediate transmission member is urged in the valve closing direction by said at least one coned disc spring under its condition capable of being advanced and returned within a first predetermined distance in the valve opening and closing directions of the valve body with respect to the thrust threaded member;

means for restraining a stopper for the handle, formed cooperatively by the thrust threaded member and the intermediate transmission member, said restraining means being so constructed as to be changed over between a handle-holding condition wherein the stopper is restrained in an engagement position with respect to the handle and a handle-releasing condition wherein its restraint against the stopper is released, whereby when the intermediate transmission member has been advanced toward the valve closing side by means of the at least one coned disc spring with respect to the thrust threaded member the restraining means is brought into the handle-holding condition, and when the thrust threaded member has been advanced toward the valve closing side against the at least one coned disc spring with respect to the intermediate transmission member the restraining means is brought into the handle-releasing condition;

a contact receiving means, provided in at least one of the intermediate transmission member and the fixing side portion of the valve box so as to limit the advancing movement of the thrust threaded member toward the valve closing side to a second predetermined distance with a contact receiving position of said contact receiving means being set at a midway position of the compression range of the at least one coned disc spring to thereby ensure that said at least one, coned disc spring is not subjected to complete compression so that said valve body sealing surface is not subjected to an abnormally large sealing contact force.

2. A stop valve as recited in claim 1, further comprising:

a revolution absorbing transmission member, disposed between the thrust threaded member and the coned disc spring, the thrust threaded member being kept in rotatable contact with the revolution absorbing transmission member.

3. A stop valve as recited in claim 2, wherein:

a thrust bearing is interposed between the thrust threaded member and the revolution absorbing transmission member.

4. A stop valve as recited in claim 1, wherein:

the restraining means of the stopper for the handle has a guide hole for the stopper, a pushing-out member for the stopper and a slide hole for the pushing-out member, the slide hole is formed in the thrust threaded member along the axial direction thereof, the guide hole is formed radially in the input portion of the thrust threaded member so as to communicate with the slide hole, and the pushing-out member is composed of a stepping-up cam portion for carrying out the pushing-out and a stepping-down concaved portion for cancelling the pushing-out, said stepping-up and stepping-down portions being arranged adjacently to each other in the axial direction of the pushing-out member, the stopper is inserted into the guide hole so as to be able to advance and retreat, and the pushing-out member is inserted into the slide hole longitudinally slidably and is connected interlockingly to the intermediate transmission member, so that when the intermediate transmission member has been advanced toward the valve closing side by the at least one coned disc spring with respect to the thrust threaded member the stopper holds the handle by being projected outside the peripheral surface of the input portion of the thrust threaded member by the stepping-up cam portion and the restraining means is placed in a handle-holding condition, and when the thrust threaded member has been advanced toward the valve closing side against the at least one coned disc spring with respect to the intermediate transmission member the stopper releases the handle by allowing the stopper to be retreated into the stepping-down concaved portion so that the restraining means is placed in a handle-releasing condition.

5. A stop valve as recited in claim 4, wherein:

the stopper comprises a plurality of balls.

6. A stop valve as recited in claim 4, wherein:

the pushing-out member is formed such that a height thereof relative to the thrust threaded member is observable by a user for confirming the valve opening and closing conditions.

7. A stop valve having a thrust threaded member for generating a valve closing thrust, in which loosening at a threaded portion is prevented by a resilient force of a coned disc spring, comprising:

a valve box, provided with a valve chamber having a valve seat;

a movable valve body provided with a sealing surface selectively movable to a valve opening position and to a valve closing position with respect to said valve seat within the valve chamber;

a thrust threaded member provided with an input portion, threadably engaged with the valve box so as to be adjustably advanced and returned with respect to a fixing side thereof;

a handle, adapted to be connected interlockingly to the input portion wherein, when said handle is turned in a valve-closing direction the thrust threaded member is advanced with respect to the valve box and said valve body is moved toward the valve closing side by a thrust imparted by the thrust threaded member so that the sealing surface thereof is brought into contact with said valve seat to attain a valve closing;

a valve closing thrust transmission mechanism comprising at least one coned disc spring surrounding an intermediate transmission member arranged in order from the thrust threaded member to the valve body, so that the intermediate transmission member is urged in the valve-closing direction by the at least one coned disc spring under its condition capable of being advanced and returned within a first predetermined distance in the valve opening and closing directions of the valve body with respect to the thrust threaded member; and a contact receiving means, provided in the fixing side portion of the valve box so as to block the movement of the thrust threaded member toward the valve closing side beyond a second predetermined distance, a contact receiving position of said contact receiving means being set at a midway position of the compression range of the at least one coned disc spring to thereby ensure that said at least one coned disc spring is not subjected to complete compression so that said valve body sealing surface is not subjected to an abnormally large sealing contact force.

8. A stop valve as recited in claim 7, further comprising:

a metal diaphragm, interposed between the valve body and the intermediate transmission member so as to seal the valve chamber hermetically.

9. A stop valve as recited in claim 7, further comprising:

a revolution absorbing transmission member, interposed between the thrust threaded member and the coned disc spring, the thrust threaded member being kept in rotatable contact with the revolution absorbing transmission member.

* * * * *